United States Patent
Johnson et al.

(10) Patent No.: US 9,138,926 B2
(45) Date of Patent: Sep. 22, 2015

(54) APPARATUS AND METHOD FOR INJECTION MOLDING

(71) Applicants: Sean F. Johnson, Hamilton, OH (US); Matthew A. Gunderson, Cincinnati, OH (US)

(72) Inventors: Sean F. Johnson, Hamilton, OH (US); Matthew A. Gunderson, Cincinnati, OH (US)

(73) Assignee: Milacron LLC, Batavia, OH (US)

( * ) Notice: Subject to any disclaimer, the term of this patent is extended or adjusted under 35 U.S.C. 154(b) by 58 days.

(21) Appl. No.: 14/085,899

(22) Filed: Nov. 21, 2013

(65) Prior Publication Data

US 2015/0137425 A1    May 21, 2015

(51) Int. Cl.
*B29C 45/64*    (2006.01)
*B29C 45/17*    (2006.01)
*B29C 45/67*    (2006.01)

(52) U.S. Cl.
CPC ......... *B29C 45/1747* (2013.01); *B29C 45/1744* (2013.01); *B29C 45/6728* (2013.01); *B29C 2045/6735* (2013.01)

(58) Field of Classification Search
CPC ................... B29C 45/6728; B29C 2045/6735; B29C 2045/688; B29C 45/66
See application file for complete search history.

(56) References Cited

U.S. PATENT DOCUMENTS 3,120,039 A * 2/1964 Stubbe et al. ................. 164/342
3,669,599 A * 6/1972 Snider et al. .................. 425/595
4,059,383 A * 11/1977 Tsutsumi .................. 425/451.6
6,231,329 B1    5/2001 Van Keuren, III
6,733,275 B2    5/2004 Fujita
7,993,129 B2    8/2011 Chiang

FOREIGN PATENT DOCUMENTS

AT    510151 A4    2/2012
DE    102011015943 A1    4/2012
JP    H08309811 A    11/1996

OTHER PUBLICATIONS

Anonymous, Machine Translation of JPH0830811 (Patent Abstracts of Japan, retrieved 2013).
Anonymous, Machine translation of AT510151A4 (European Patent Office, generated 2013).
Anonymous, Machine translation of DE102011015943A1 (European Patent Office, generated 2013).

* cited by examiner

*Primary Examiner* — Jill Heitbrink

(57) ABSTRACT

An apparatus simultaneously operates all split locking nuts of an injection molding machine two-platen clamp unit to engage and disengage the split locking nuts with clamp unit strain rods. Each split locking nut has opposed pivoting nut halves operated by coupling rotation of a rotating member through a predetermined angular range to the nut halves via translating members such as push rods. The push rods are pivotably connected to the rotating member and to the nut halves so that the direction of each push rod relative to the rotating member and to the nut half changes with rotation of the rotating member. A method of molding comprises: disengaging split locking nuts from strain rods; positioning a moveable platen assembly to abut mating mold components; simultaneously operating the split locking nuts to engage the strain rods; and, applying force to the abutted mold components sufficient for injection and cure of melt.

18 Claims, 7 Drawing Sheets

APPARATUS AND METHOD FOR INJECTION MOLDING

BACKGROUND OF THE INVENTION

1. Field of the Invention

This invention relates generally to injection molding machinery and particularly to locking devices in so-called "two platen" clamp units wherein a movable platen assembly comprises a mold member mounting paten and a clamp force actuator, the locking devices fixing location of the movable platen for injection when mating mold members are seated.

2. Description of Related Art

In so-called "two platen" clamp units of injection molding machines, it is known to provide a stationary platen for supporting first mold components and a movable platen assembly for supporting second (mating) mold components. The movable platen assembly advantageously comprises a mold member mounting platen for supporting second (mating) mold components and a clamp force actuator connected to the mold member mounting platen so as to apply clamp force to the mold member mounting platen. In such constructions, it is known to rely on split fixing ("locking") nuts for releaseably engaging tie bars (also known as "strain rods") of the clamp unit to fix location of the movable platen assembly relative to the stationary platen for generation of a desired clamp force. Such split locking nuts comprise opposed nut halves movable relative to each other allowing engagement and disengagement of the strain rods. The locking nuts advantageously have internal surface features for engagement with mating external surface features of the strain rods. To fix ("lock") the movable platen assembly in place when mating mold members are engaged, the nut halves are "closed" so that the internal surface features of the locking nuts engage the external surface features of the strain rods to prevent movement of the nuts longitudinally along the strain rods. The locking nuts abut the movable platen assembly whereby, with the mating mold members engaged, the movable platen assembly is locked in place. With the nut halves "closed" and mating mold components seated, force applied to the mold mounting platen of the moveable platen assembly by the clamp force actuator is transferred through the movable platen assembly and reaction force at the locking nuts is transferred to the strain rods to effect application of a desired clamping force on the mating mold members for injection molding. The aforesaid two platen clamp units customarily have four strain rods and four split locking nuts together with actuators for engaging and disengaging the nut halves with the strain rods. Known constructions of such locking nuts provide actuators for pairs of locking nuts resulting in potential non-simultaneous actuation of all locking nuts and attendant undesired noise of operation as nut halves engage strain rods.

SUMMARY OF THE INVENTION

It is an object of the present invention to simultaneously operate all split locking nuts of a two platen clamp unit so that disengagement and engagement of nut halves with strain rods of the clamp unit occur simultaneously.

It is a further object of the present invention to simultaneously apply force to each nut half of the split locking nuts effective to move the nut half so as to disengage and engage the internal surface features of that nut half with mating external surface features of the associated strain rod.

It is a still further object of the present invention to couple rotation of a rotating member through a predetermined angular range to the nut halves of the split locking nuts so as to simultaneously engage and disengage the nut halves with the strain rods.

Further objects and advantages of the invention shall be made apparent from the accompanying drawings and the following description thereof.

In accordance with the aforesaid objects the present invention provides an apparatus for simultaneous actuation of split locking nuts of a clamp unit of an injection molding machine, the clamp unit comprising: a fixed platen for supporting first mold members; a movable platen assembly for supporting second mold members; and a plurality of strain rods spanning from the fixed platen through the moveable platen assembly, the movable platen assembly comprising a mold supporting platen for supporting the second mold members, a clamp force actuator, and a plurality of split locking nuts each split locking nut comprising opposed movable nut halves for releaseably engaging an associated strain rod, the number of split locking nuts being no less than the number of strain rods, wherein the apparatus comprises a rotating member; a plurality of push rods, a first end of each push rod being connected to the rotating member and a second end of each push rod being connected to one movable nut half; the rotating member, opposed movable nut halves and push rods being arranged so that rotation of the rotating member through a predetermined angular range effects longitudinal translation of the push rods and movement of all opposed moveable nut halves so as to effect engagement and disengagement of all split locking nuts with the strain rods; and, a split locking nut actuator for effecting rotational movement of the rotating member. Advantageously, the rotating member is disk-like and comprises plural arms each having an open recess at the end thereof at which a pair of push rods is connected and each movable nut half is pivotably mounted to the movable platen assembly so that translation of the connected push rod pivots the nut half. A method of operation of a clamp unit of an injection molding machine in accordance with the invention comprises simultaneous disengagement of the split locking nuts from the strain rods, positioning of the movable platen assembly to abut mating mold assemblies, simultaneous engagement of the split lock locking nuts with the strain rods and operation of the clamp force actuator to apply a clamp force to the abutted mold assemblies sufficient for injection and curing of melt.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Plastics Processing Machine & Equipment

For purposes of illustrating the invention, an injection molding machine and control shall be described in detail. Control of the injection molding machine is effective to achieve performance of a machine cycle of operation to produce molded articles from thermoplastic raw material. A conventional machine cycle of operation for injection molding comprises conversion of raw material in solid form to a highly viscous, homogeneous form (so-called "melt") suitable for injection, accumulation of a predetermined quantity of melt, forcing ("injecting") melt into mold cavities, "curing" the material within the mold cavities to a sufficiently solid condition and removing the solidified molded articles. Mold cavities are created by abutment ("seating") of mating mold components and the machine cycle of operation includes abutment of mating mold components for filling of mold cavities and separation of mating mold components for removing molded articles.

Figure 1:
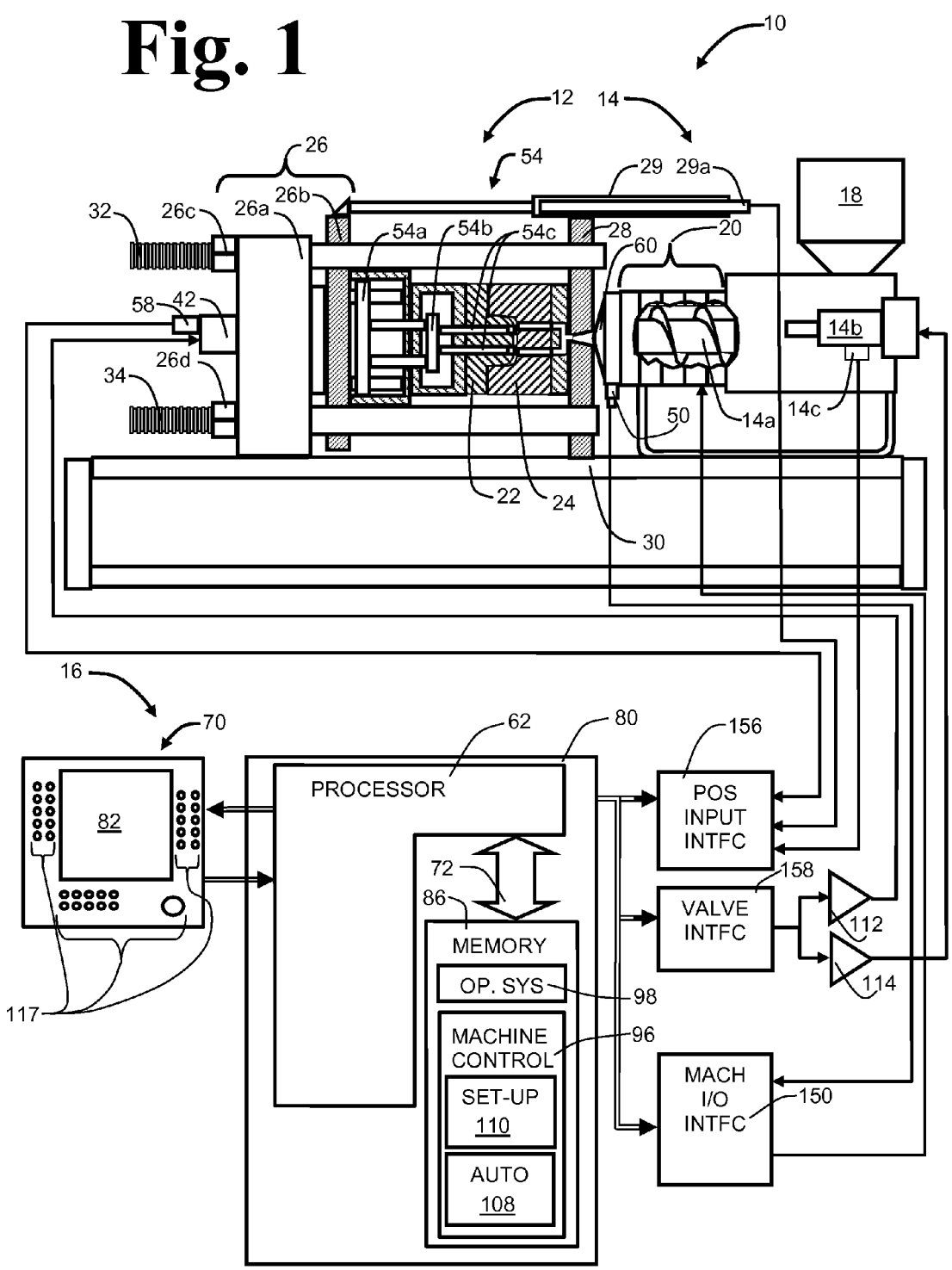
FIG. 1 illustrates an injection molding machine [and control] comprising an environment for the locking nut arrangements of the present invention.

Referring to FIG. 1, an injection molding machine 10 includes a clamp unit 12 and an injection unit 14. Typical of plastic injection molding machines, raw material in the form of pellets and/or powders is introduced to injection unit 14 through hopper 18. Injection unit 14 includes a barrel portion 60, typically surrounded by external heating elements 20, and an internal material working screw 14a shown in the cutaway of injection unit 14. Raw material entering barrel portion 60 from hopper 18 is melted, i.e., plasticized, by a combination of heating and material working. Material heating is effected partially by means of heater elements 20 and partially by friction and shear effected by rotation of material working screw 14a. Plasticized material (so-called "melt") is conveyed by rotation of the working screw toward the exit end of barrel portion 60, i.e., the end in communication with clamp unit 12, displacing working screw 14a away from clamp unit 12. Rotation of the material working screw 14a of injection unit 14 is effected by a rotating machine (not shown), for example, an electrically or hydraulically powered motor wherein an armature is rotated relative to a stator. Advantageously, that rotating machine is servo controlled, i.e., is operated in combination with a transducer effective to produce signals useful for regulation of the speed of rotation of screw 14a. Once a sufficient volume of material has been plasticized, working screw 14a is advanced within barrel portion 60 to force melt through the exit into a cavity or cavities defined by mating mold subassemblies 22 and 24. Each of mold subassemblies 22 and 24 advantageously comprise a so-called "mold base" supporting a so-called "mold die" defining a portion of the mold cavities created by abutment of the mating mold subassemblies 22 and 24. Immediately following injection of melt into the mold cavities, force applied to working screw 14a is maintained at a sufficient level to prevent excessive shrinkage of melt as it solidifies within the mold cavities. Immediately prior to separation of mold subassemblies 22 and 24, force applied to working screw 14a is relieved so as to prevent expulsion of melt from the exit end of barrel portion 60 when mold subassemblies 22 and 24 are separated. Translation of material working screw 14a is effected by actuators such as hydraulic actuator 14b, wherein movement of a piston within a cylinder is coupled to move working screw 14a within barrel portion 60. Advantageously, actuator 14b is servo controlled, i.e., operated in connection with a transducer, such as transducer 14c, suitable for measuring translational position of material working screw 14a relative to barrel portion 60. Servo control of actuator 14b is effective for regulating the speed of, at least, advance of material working screw 14a during injection of melt into mold cavities and for regulating force acting on material working screw 14a as melt cures within the mold cavities.

Continuing with reference to FIG. 1, clamp unit 12 comprises stationary ("fixed") platen 28 and movable platen assembly 26, comprising clamp force actuator subassembly 26a and mold member mounting platen 26b. Clamp force actuator subassembly 26a comprises a clamp force actuator (not shown in FIG. 1) connected to mold mounting platen 26b and split locking nuts such as split locking nuts 26c and 26d. Clamp force actuator subassembly 26a is supported by rails of machine base 30 and is movable relative to clamp unit strain rods, such as comprise strain rod pairs 32 and 34, spanning from fixed platen 28 through movable platen assembly 26. Clamp unit 12 holds mold subassemblies 22 and 24 in abutment during injection and thereafter until melt has sufficiently solidified to be removed without unacceptable deformation. Fixed platen 28 supports mold subassembly 24 and is rigidly mounted to machine base 30. Strain rods of strain rod pairs 32 and 34 are supported at opposite ends by fixed platen 28 and movable platen assembly 26. Movable platen assembly 26 is slidably movable relative to strain rod pairs 32 and 34 for reciprocation between "open" and "closed" positions, "closed" referring to the advanced position wherein mating mold components form at least one cavity for producing molded articles. As shown in FIG. 1 mating mold subassemblies 22 and 24 are abutted corresponding to the "closed" position of clamp unit 12. Movable platen assembly 26 is reciprocated between "open" and "closed" positions by actuators such as actuator 29, advantageously a hydraulically operated piston and cylinder actuator, supported by fixed platen 28 and mold member mounting platen 26a. Position of movable platen assembly 26 is measured by position transducer 29a, advantageously a linear position transducer producing electrical signals representing position of movable platen assembly 26.

Continuing with reference to FIG. 1, with mold member subassemblies 22 and 24 abutted, locking nuts such as locking nuts 26c and 26d are operated to engage the strain rods of strain rod pairs 32 and 34 to prevent movement of movable platen assembly 26 away from fixed platen 28. Each locking nut comprises opposed mating nut halves movably supported on clamp force actuator sub assembly 26a. An actuator such as actuator 42 provides motive power to a split locking nut mechanism (not shown in FIG. 1) to reciprocate the opposed halves of each split locking nut to engage and disengage the associated strain rod. Advantageously, actuator 42 is servo controlled, i.e., works in combination with a position measuring transducer 58 which produces electrical signals representing position pertaining to operation of the split locking nuts. Position measuring transducer 58 may be a linear transducer or an angular transducer such as a rotary encoder coupled to actuator 42 to produce signals representing relative position of a member of actuator 42 corresponding to position of movable nut halves of the split locking nuts.

Continuing with reference to FIG. 1, split locking nuts such as split locking nuts 26c and 26d remain engaged with the strain rods throughout injection and curing of melt. Once sufficient time has elapsed to permit separation of mold member subassemblies 22 and 24, the split locking nuts are disengaged from the strain rods to allow movement of movable platen assembly 26 away from fixed platen 28. The clamp force actuator of clamp force assembly 26a advantageously comprises a hydraulically operated piston and cylinder characterized by a relatively short stroke length and relatively large piston and cylinder diameter, i.e., a so-called "pancake cylinder". With split locking nuts such as split locking nuts 26c and 26d engaged with the strain rods, force exerted by the clamp force actuator on mold mounting platen 26b is transferred through mold member mounting platen 26b to mating mold assemblies 22 and 24 and the generated reaction force is transferred by clamp force actuator sub assembly 26a to the split locking nuts to place the strain rods under strain. The transferred reaction force can result in elastic stretching of strain rods of strain rod pairs 32 and 34. In this manner, a clamping force is created sufficient to prevent separation of mold member subassemblies 22 and 24 during melt injection and curing. Clamp force is reduced in preparation for separation of mold member subassemblies and with clamp force so reduced, the split locking nuts are disengaged from the strain rods to permit movement of movable platen assembly 26 away from fixed platen 28.

Continuing with reference to FIG. 1, a power operated ejector mechanism 54 is illustrated in FIG. 1 disposed between mold member mounting platen 26b and the mold die comprising mold subassembly 22. Ejector mechanism 54 effects translation of movable members in mold subassembly 22 to dislodge a molded article from the mold die of mold member subassembly 22. An actuator (not shown in FIG. 1) provides motive force for ejector mechanism 54 through ejector bar 54a. Translation of ejector bar 54a is coupled to an ejector plate 54b from which ejector pins 54c project. Translation of ejector bar 54a advances ejector pins to extend beyond a molding surface and retracts ejector pins 54c so that the free ends thereof are flush with the same molding surface.

Although not shown in FIG. 1, it is to be understood that for equipment having hydraulically actuated devices, a conventional combination of a pump and reservoir comprise a facility for supplying pressurized hydraulic fluid to and recovering hydraulic fluid from such devices. Valves are used to control flow of the hydraulic fluid so as to be re-circulated from the reservoir to the hydraulically actuated devices and back to the reservoir. Likewise, although not shown in FIG. 1, in instances where electrically operated devices actuate machine mechanisms, electrical energy is connected to the equipment and application of electrical energy is controlled by combinations of electromechanical devices such as relays and mechanical switches and, electronic devices such as amplifiers and current switching elements.

Machine Control

The preferred embodiment of a machine control system is depicted as control system 16 comprising: operator station 70 comprising display device 82, advantageously a touch screen display facilitating data entry, and operator buttons 117; program controlled processor 80 comprising digital processor 62 and memory 86 comprising mass storage capacity for programs and data and temporary storage capacity suitable for support of high speed processing by digital processor 62; and, interface circuits such as position input interface circuits 156, valve interface circuits 158 and machine input and output interface circuits 150. As is conventional, data processing functions performed by programmed controlled processor 80 are controlled by operating system programs 98 controlling execution of "application" programs such as machine control programs 96. Machine control 16 produces signals for controlling the operation of machine devices, such as actuators and/or motors which actuate mechanisms of the injection molding machine, heaters 20 and other devices not shown but typical of such machines and associated equipment. Output signals defining, for example, position, velocity, and/or acceleration are conditioned as appropriate at valve interface circuits 158 and applied to hydraulic valve amplifiers 112 and 114 to control electrical current from a suitable power source and delivered to actuators operating valves that control flow of hydraulic fluid to and from mechanism actuators such as actuators 14b, 29 and 42. As is conventional, signals produced by position transducers 14c, 29a and 58 are used for control of actuators 14b, 29 and 42. Outputs of transducers 14c, 29a and 58 are conditioned for use by digital system 80 by position transducer interface circuits 156. Machine input/output interface circuits 150 perform signal conditioning for signals produced by or applied to machine devices including without limitation electrical heating elements 20, mechanically operated switches, solenoids, relays, proximity sensors, temperature sensors and pressure sensors.

Continuing with reference to FIG. 1, machine control programs 98 comprise programs supporting both machine set-up, i.e., set-up programs 108, and automatic operation, i.e., "Auto" programs 110. During machine set-up, user entry of parameter data appropriate to the material and articles being molded is enabled. Data entry can be effected manually using the touch screen of display 82 or by selection of a pre-recorded "menu" of parameter data. Automatic operation enables repeated execution of a machine cycle of operation effective to process raw material and produce molded articles. As is conventional, automatic operation will continue until ceased by any of completion of a predetermined number of machine cycles of operation, user intervention or detection of an out-of-tolerance condition of a machine component requiring attention, adjustment, repair or replacement. Examples of out-of-tolerance conditions include, but are not limited to: insufficiency of raw material at hopper 18, unacceptable temperatures at any of heaters 20 as detected by temperature sensor 50, unacceptable rate of rotation of working screw 14a, out-of-tolerance position of any of working screw 14a, movable platen 26, and actuator 42 and out-of-tolerance force acting on working screw 14a. Advantageously, machine control programs 98 support display of so-called "alarms" at display 82 indicative of selected out-of-tolerance conditions. While manufacturer's settings can cause immediate interruption of automatic execution in the event certain faults are detected, it is also contemplated that in the course of machine set-up, user's can select responses including cessation of automatic operation in the event of detection of certain out-of-tolerance conditions. In either case, machine control programs 98 prohibit resumption of automatic operation until the fault or out-of-tolerance condition is cleared through user action.

A mold clamp actuator of a movable platen assembly shall be described with reference to FIGS. 2a and 2b. Mold clamp actuator subassembly 26a comprises actuator housing 160 in which are disposed an actuator cylinder 162 (shown hidden (dashed line) in FIG. 2a) and actuator ram (piston) 164 (shown hidden (dashed line) in FIG. 2a) and bores 166-172 through which pass strain rods 32a, 32b, 34a and 34b of strain rod pairs 32 and 34. Actuator cylinder 162 and actuator piston 164 are characterized by large diameters relative to stroke distance as known in so-called "pancake" cylinder actuators. Displacement of actuator piston 164 within actuator cylinder 162 is advantageously effected by application of pressurized hydraulic fluid. Movable mold mounting platen 26b is advantageously attached to ram 164 by fasteners (not shown). The mold clamp actuator is operated to maintain position of ram 164 relative to housing 160 so that actuator housing 160 and movable mold mounting platen 26b move together relative to strain rods 32a-34b during relocation of moveable platen assembly 26. With movable mold mounting platen 26b advanced to bring mating mold member components proximate for abutment, split locking nuts are operated to engage the strain rods to prevent displacement of actuator housing 160. The mold clamp actuator is then operated to advance mold mounting platen 26b relative to actuator housing 160 so as to seat mating mold components and apply desired clamp force for injection and curing of melt to the mated mold components. The resultant reaction force acts through actuator housing 160 and is transferred by the split locking nuts to strain rods 32a-34b of strain rod pairs 32 and 34.

Figure 2A:
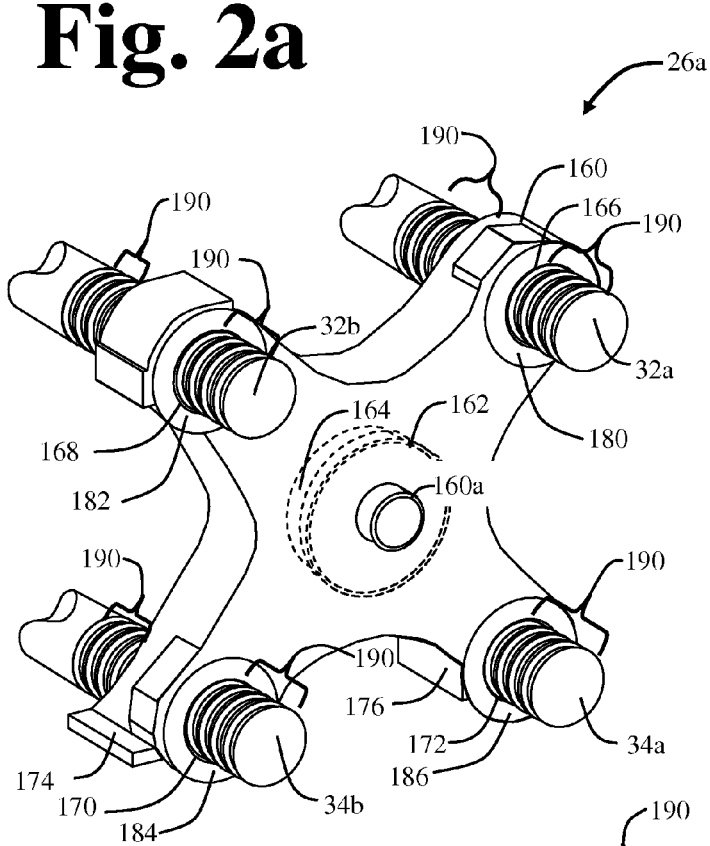
FIGS. 2*a* and 2*b* illustrate the clamp force actuator of the movable platen assembly of the injection molding machine of FIG. 1.
Figure 2B:
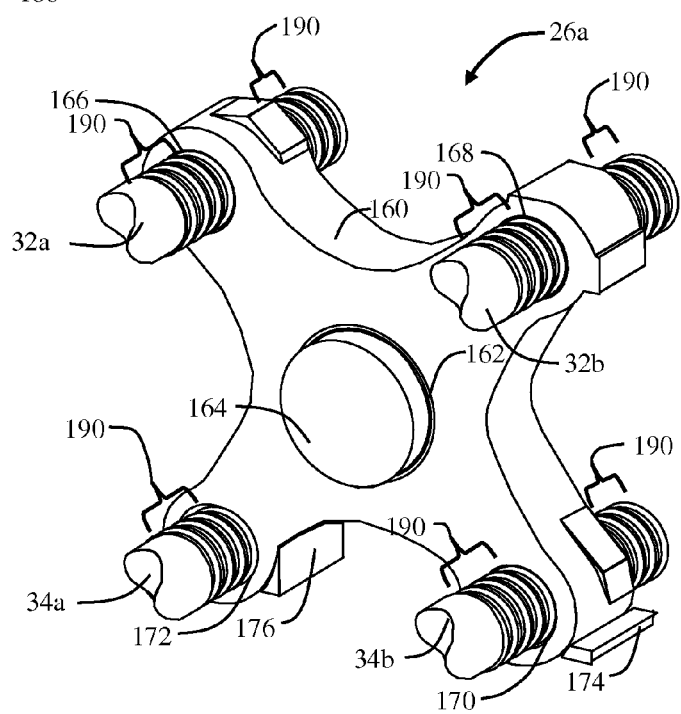

Continuing with reference to FIGS. 2a and 2b, actuator housing 160 further comprises a hub 160a for supporting a rotatable member of a strain rod locking mechanism and guides 174 and 176 for contacting rails comprising machine base 30. Actuator housing 160 is slidably supported on machine base rails (not shown) by guides 174 and 176 so as to allow strain rods 32a, 32b, 34a and 34b to pass freely through, respectively, bores 166, 168, 170 and 172. Advantageously, bosses, such as bosses 180, 182, 184 and 186 surround the intersection of, respectively, bores 166, 168, 170 and 172 with the face of actuator housing 160 on which the split locking nut operating device is mounted. Bosses 180-186 provide flat mounting surfaces for mounting movable split locking nut halves (not shown in FIGS. 2a and 2b) that engage strain rods 32a, 32b, 34a and 34b of strain rod pairs 32 and 34. As shown in FIGS. 2a and 2b, portions of strain rods 32a, 32b, 34a, and 34b passing through actuator housing 160 comprise surface features such as grooves 190 that are engaged with mating internal surface features of split locking nuts when the split locking nuts are "closed" on strain rods 32a, 32b, 34a and 34b.

A strain rod locking mechanism in accordance with the present invention shall be described with reference to FIGS. 3a and 3b. Each of split locking nuts 26c, 26d, 26e and 26f have pivoting nut halves supported on actuator housing 160 so as to be pivotable relative to an associated strain rod (pivotable nut halves shown "closed" with respect to the strain rods in FIG. 3a and "open" with respect to the strain rods in FIG. 3b). As shown: pivotable nut halves 200 and 202 comprising split locking nut 26c are disposed to be engageable with strain rod 32a, pivotable nut halves 204 and 206 comprising split locking nut 26e are disposed to be engageable with strain rod 32b; pivotable nut halves 208 and 210 comprising split locking nut 26d are disposed to be engageable with strain rod 34a; and, pivotable nut halves 212 and 214 comprising split locking nut 26e are disposed to be engageable with strain rod 34b. Each nut half is pivotable about a nut half pivot pin attached to actuator housing 160, such as nut half pivot pins 220, 222, 224, 226, 228, 230, 232 and 234, each establishing a pivot axis for the associated movable nut half. Nut half pivot pins 220-234 provide for retention of the associated pivotable not halves to actuator housing 160 by, for example, a combination of an enlarged head end outboard of the associated pivotable nut half and threaded engagement of the nut half pivot pin with actuator housing 160. As best seen in FIG. 3b, each pivotable nut half comprises internal surface features such as arcuate ribs 192 aligned to engage external surface features, such as grooves 190, of the associated strain rod. With split locking nuts 26c, 26d, 26e and 26f "open" (as shown in FIG. 3b) internal ribs 192 of pivotable nut haves 200-214 are spaced away from grooves 190 of the associated strain rods so that movable platen assembly 26 is free to be moved toward or away from fixed platen 28.

Figure 3A:
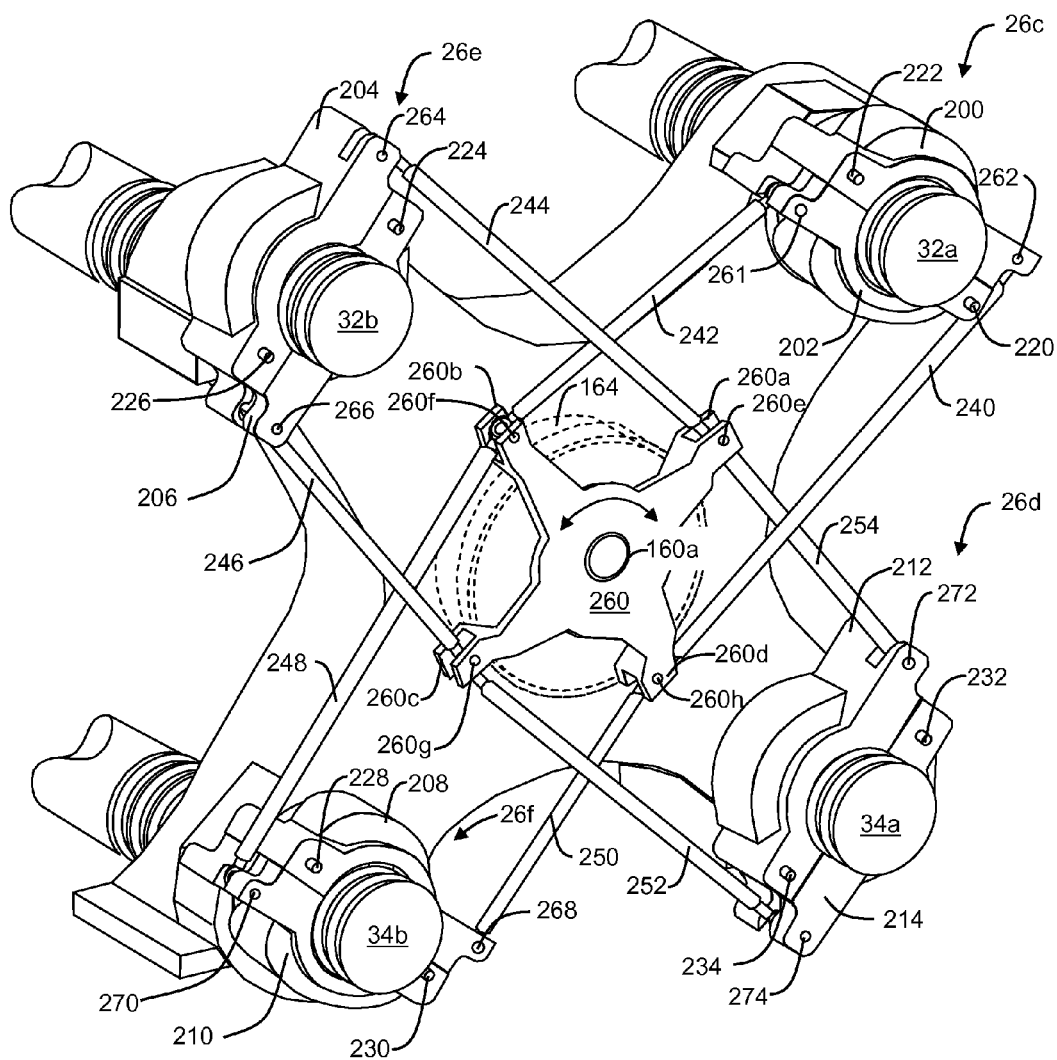
FIGS. 3*a* and 3*b* illustrate a first embodiment of the present invention with pivoting mating halves of locking nuts for engagement of the locking nuts with the strain rods.
Figure 3B:
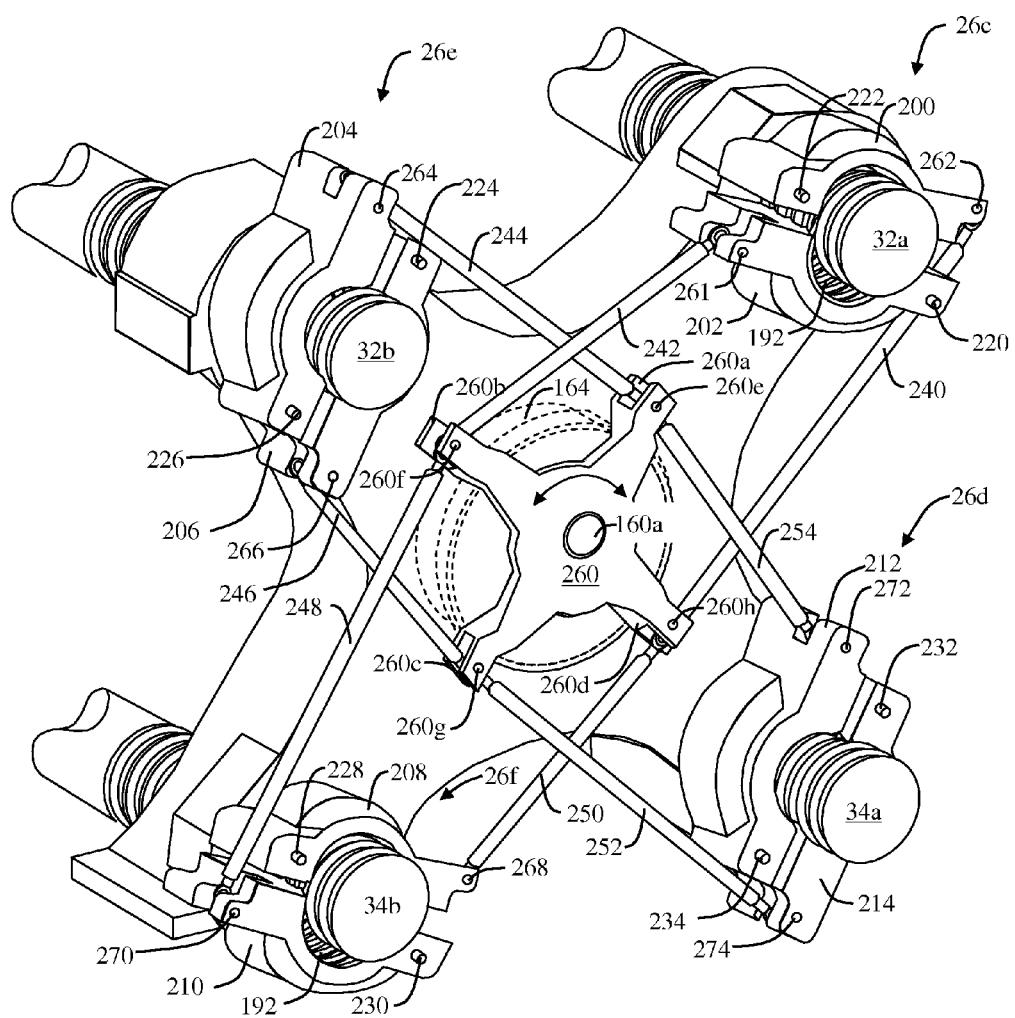

Continuing with reference to FIGS. 3a and 3b, pivoting of each of pivotable nut halves 200-214 is effected by translation of a nut half push rod such as nut half push rods 240, 242, 244, 246, 248, 250, 252 and 254 connected to the pivotable nut half at a nut half connecting pin, such as nut half connecting pins 261, 262, 264, 266, 268, 270, 272 and 274, each located on the side of the pivotable nut half relative to the strain rod that is diametrically opposite the side supported by the nut half pivot pin. Push rod terminations, such as eye rod ends are affixed to the ends of push rods connected to pivotable nut halves, the push rod terminations allow the push rods to pivot around the nut half connecting pins and define a push rod connection pivot axis nominally aligned with the centerline of the associated connecting pin. The end of each of push rods 240-254 not connected to a pivotable nut half is connected to a rotor arm of a disk-like member 260 rotatably mounted to actuator housing 160 and supported on hub 160a. Ends of two push rods are connected to disk-like member 260 at a forked end of each of rotor arms 260a, 260b, 260c and 260d by means of a rotor connecting pin, such as rotor connecting pins 260e, 260f, 260g and 260h (best seen in FIGS. 5a-5c), and push rod terminations such as eye rod ends through which the rotor connecting pin passes so as to allow the two push rods to pivot relative to the rotor connecting pin. At each of rotor arms 260a-260d, eye rod ends are disposed side-by-side within the recess defined by the fork of the disk-like member rotor arms.

Figure 4A:
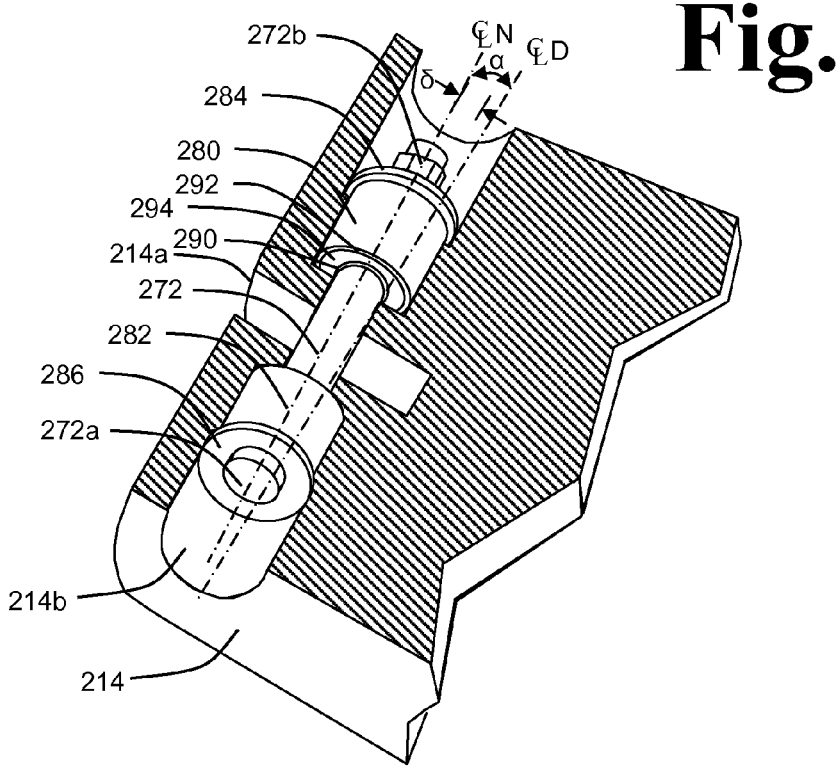
FIGS. 4*a* and 4*b* illustrate details of connections of opposed ends of push rods with a locking nut and with a driving member of the present invention.

Particulars of connections of opposed ends of push rods 240-254 of FIGS. 3a and 3b shall be described with reference to FIGS. 4a and 4b. In FIG. 4a, a partial cross section of split locking nut half 214 is shown with nut half connecting pin 272 bridging slot 214a in which a push rod termination such as an eye rod end (not shown in FIG. 4a) is received. As noted, a push rod connection pivot axis defined by the push rod termination is nominally aligned with the centerline of connecting pin 272. Nut half connecting pin 272 is supported at opposed ends within bore 214b through split locking nut half 214 by cylindrical elastomeric bushings 280 and 282. Bore 214b has enlarged ends open to the opposed faces of split locking nut half 214 to allow installation of elastomeric bushings 280 and 282. Washers, such as washers 284 and 286, cover the outside ends of elastomeric bushings 280 and 282. Nut half connecting pin 272 advantageously has one enlarged head end 272a abutted against one of washers 284 and 286 and a threaded shank portion protruding beyond the other of washers 284 and 286 allowing application of a nut 272b to the threaded shank end to clamp elastomeric bushings 280 and 282 between enlarged head end 272a and nut 272b. Each of elastomeric bushings 280 and 282 comprise a cylindrical rigid inner sleeve 290, a cylindrical rigid outer sleeve 292, and an elastomeric member 294 between the inner and outer sleeves. Elastomeric member 294 is elastically compressible allowing rigid inner sleeve 290 to be slightly displaced relative to outer sleeve 292 when outer sleeve 292 is fixed in position within bore 214b. The use of bushings 280 and 282 accommodates deflection of the region of actuator housing 160 proximate bosses 180-186 that can occur when clamping force subjects strain rods 32a-34b to strain sufficient for elastic stretch thereof. Such deflection can result in forces that could deform or otherwise damage a nut half connecting pin in consequence of changes of alignment between the longitudinal centerline of the bore through the nut half and the connection nominal centerline (designated "$\mathbb{C}N$" in FIG. 4a) through the eye rod end through which the nut half connecting pin passes. In FIG. 4a, the deflected centerline of bore 214b is designated by "$\mathbb{C}D$" and the angular and translational displacement of deflected centerline "$\mathbb{C}D$" from nominal centerline "$\mathbb{C}N$" are illustrated by angle "$\alpha$" and translational displacement "$\delta$", respectively. In the event of such forces, elastomeric bushings, such as elastomeric bushings 280 and 282, allow the supported nut half connecting pin, such as nut half connecting pin 272, to change alignment (angularly and translationally) relative to the centerline of the bore through the locking nut half, such as bore 214b, without deformation of the nut half connecting pin or damage to the nut half connecting pin segment passing through the eye rod end.

Figure 4B:
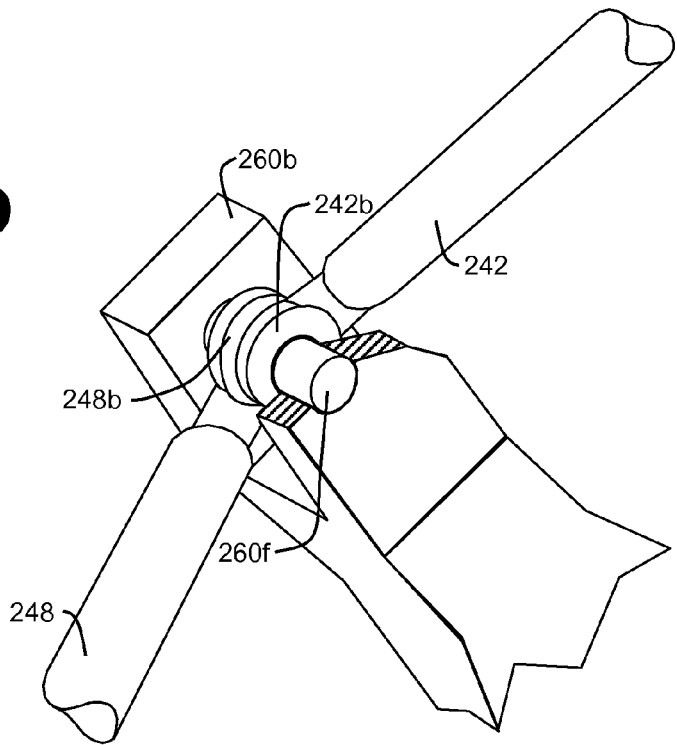

Continuing with reference to FIG. 4b, a portion of rotor arm 260b of disk-like member 260 is shown in partial cross section revealing the side-by-side arrangement of eye rod ends 242b and 248b within the recess defined by the fork of rotor arm 260b. Rotor connecting pin 260f is secured in the forked end of rotor arm 260b bridging the recess in which eye rod ends 242b and 248b are received and passing through a through hole of each of eye rod ends 242b and 248b. Connection of push rods 242 and 248 with rotor arm 260b is effective to translate push rods 242 and 248 with rotation of disk-like member 260 relative to hub 160a and to allow pivoting of push rods 242 and 248 relative to rotor connecting pin 260f. In consequence of that arrangement, and the permitted pivoting of the ends of push rods engaged with nut half connecting pins 261 and 270, the directions of push rods 242 and 248 relative to rotor arm 260b changes as disk-like member 260 rotates and linked pivoting nut halves 202 and 210 pivot relative to, respectively, pivot pins 220 and 230. In consequence of the changing directions of push rods 242 and 248 with translation of same, direction of force coupled from rotation of disk-like member 260 is effective to pivot connected nut halves 202 and 210.

Figure 5A:
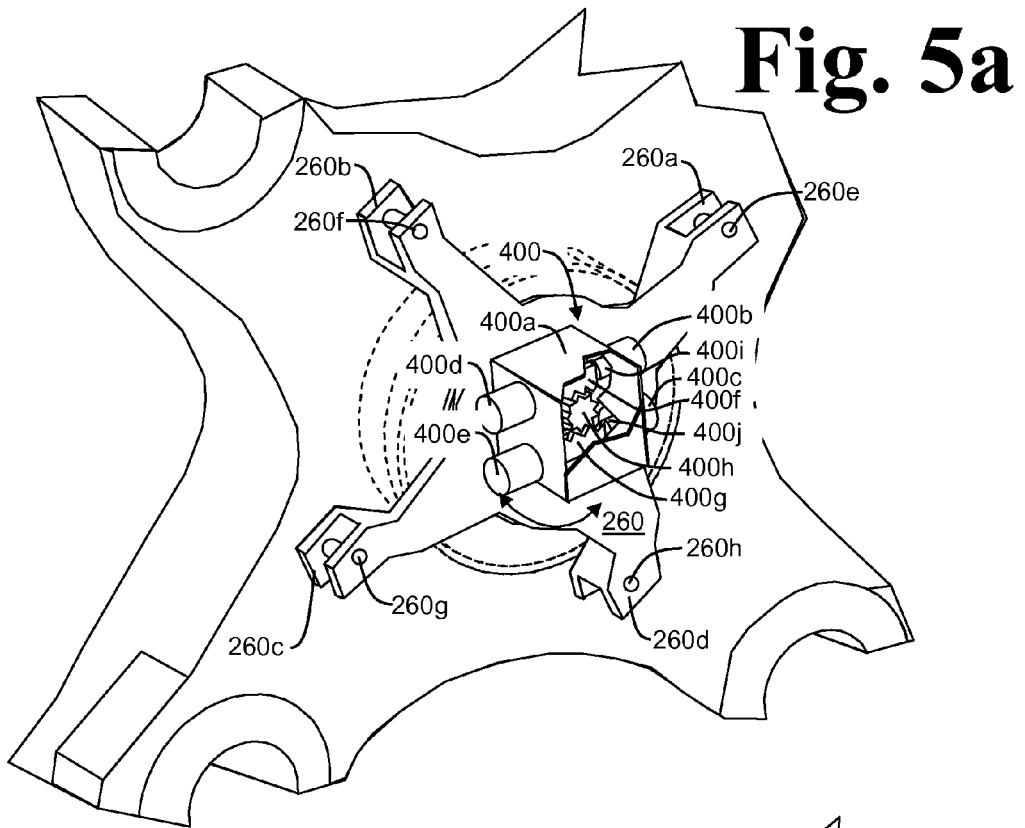
FIGS. 5*a*-5*d* illustrate alternative actuators suitable for use with the locking nut arrangements of the present invention.

As illustrated in FIGS. 3a, and 3b, disk like member 260 is rotatable through a predetermined angular range about a central axis (the range represented by the double ended arcuate arrow shown on disk like member 260). Rotation through that angular range may be effected by various actuators including, without limitation, eccentric mechanisms, rack-and-pinion mechanisms and rotating machine drives (whether hydraulically or electrically operated). FIGS. 5a, 5b, 5c and 5d illustrate alternative actuators for imparting rotation of disk-like member 260 through the predetermined angular range. Referring to FIG. 5a, a rack and pinion mechanism 400 comprises piston-cylinder actuators 400a, 400b, 400c, and 400d (advantageously, hydraulically operated) affixed to mechanism housing 400a (shown in partial cutaway), two opposed toothed racks 400f and 400g, each rack connected between opposed piston-cylinder actuators by actuator push rods such as push rods 400i and 400j, and a pinion 400h engaging racks 400f and 400g. Piston-cylinder actuators 400b and 400d provide motive force for bi-directional translation of rack 400f and piston cylinder actuators 400c and 400e provide motive force for bi-directional translation of rack 400g. Translation of racks 400f and 400g in opposite directions transverse to the rotational axis of pinion 400h effects rotation of pinion 400h. Mechanism housing 400a is fixedly mounted to hub 160a and pinion 400h is coupled to disk-like member 260 so that rotation of pinion 400h effects rotation of disk-like member 260. A position transducer, such as position transducer 58 (see FIG. 1) and coupled directly to pinion 400h or to disk-like member 260 provides signals representing position of disk-like member 260 within its angular range. Rotation of pinion 400h is effected to rotate disk-like member 260 through the predetermined angular range.

Figure 5B:
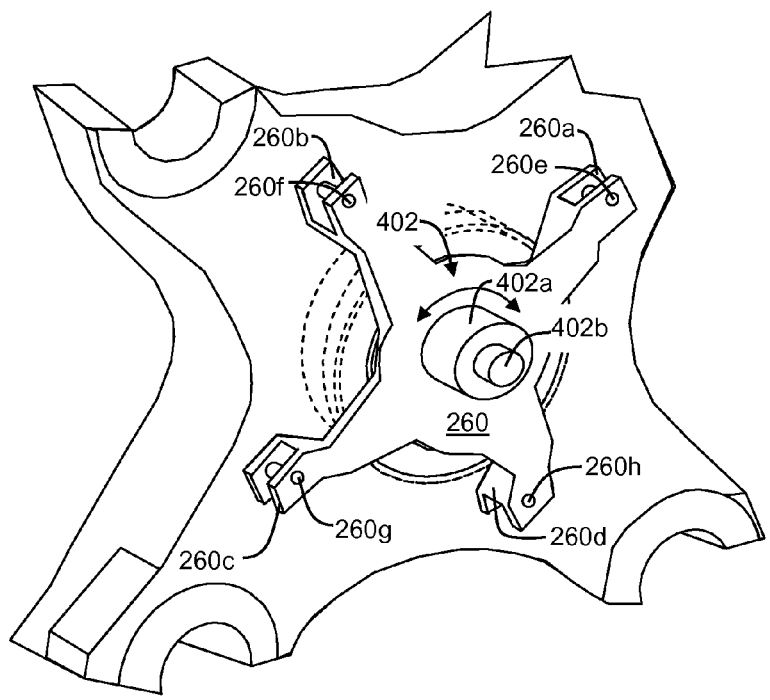

Referring to FIG. 5b, a rotating machine 402 is shown mounted so as to provide direct drive of disk-like member 260. Rotating machine 402 comprises a rotor and stator arranged for relative rotation, typically the stator comprising rotating machine housing 402a that is fixedly connected to hub 160a so as to be immobile relative to actuator housing 160. The machine rotor is connected to disk-like member 260, directly or indirectly through a coupling or transmission, so that rotation of the machine rotor effects rotation of disk-like member 260. Advantageously, a rotary transducer 402b for measuring angular position of the machine rotor is mounted to machine housing 402a. Suitable known rotary transducers include digital devices such as encoders and analogue devices such as potentiometers. Angular position measurements of rotary transducer 402b are directly correlated to angular position of disk-like member 260 within its angular range. Rotating machine 402 is operated to effect rotation of disk-like member 260 through the predetermined angular range.

Figure 5C:
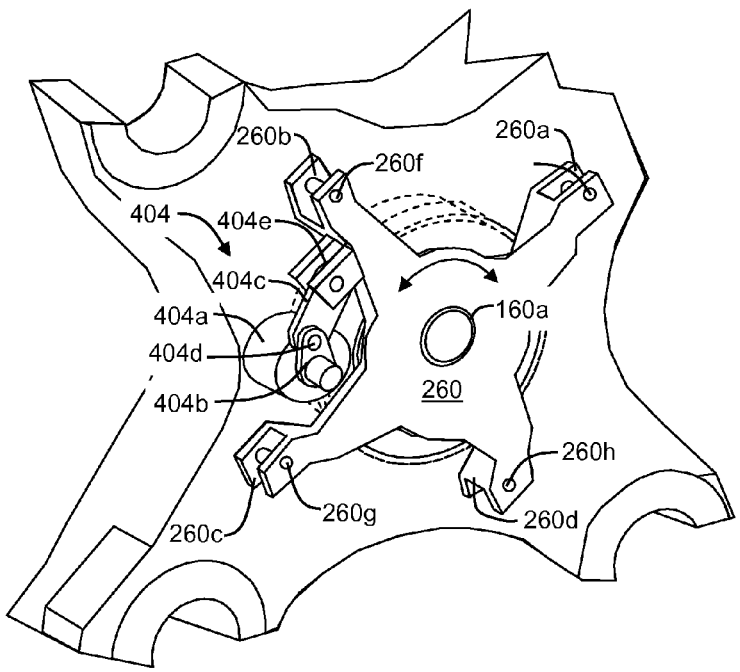

Characteristic of an eccentric actuator, a source of motive force imparts translation to a translating member connected to a rotating member at a location along a radius from the rotating member center of rotation and displaced therefrom so that translation of the translating member imparts rotation to the rotating member. Referring to FIG. 5c, an eccentric actuator 404 is shown mounted to actuator housing 160 and connected to rotor arm 260b of disk-like member 260. Eccentric actuator 404 comprises a rotating machine 404a, machine arm 404b, and link 404c, the translating member of eccentric actuator 404. Link 404c is connected to machine arm 404b by a machine arm connecting pin 404d proximate the outer end of machine arm 404b. Link 404c is connected to disk-like member rotor arm 260b by disk-like member arm connecting pin 404e. Link 404c is free to pivot relative to machine arm connecting pin 404d and free to pivot relative to disk-like member arm connecting pin 404e. Rotating machine 404a effects rotation of machine arm 404b so as to cause machine arm connecting pin 404d to sweep through an arc determined by the radial distance from the center of rotation of machine arm 404b. Rotation of machine arm 404b effects translation of link 404c while permitting the direction of link 404c relative to machine arm 404b to change. Likewise, with translation of link 404c and resulting rotation of disk-like member 260 relative to hub 160a, the direction of link 404c relative to rotor arm 260b changes. Rotation of disk-like member 260 through the predetermined angular range is effected by rotation of machine arm 404b and resulting translation of link 404c.

Figure 5D:
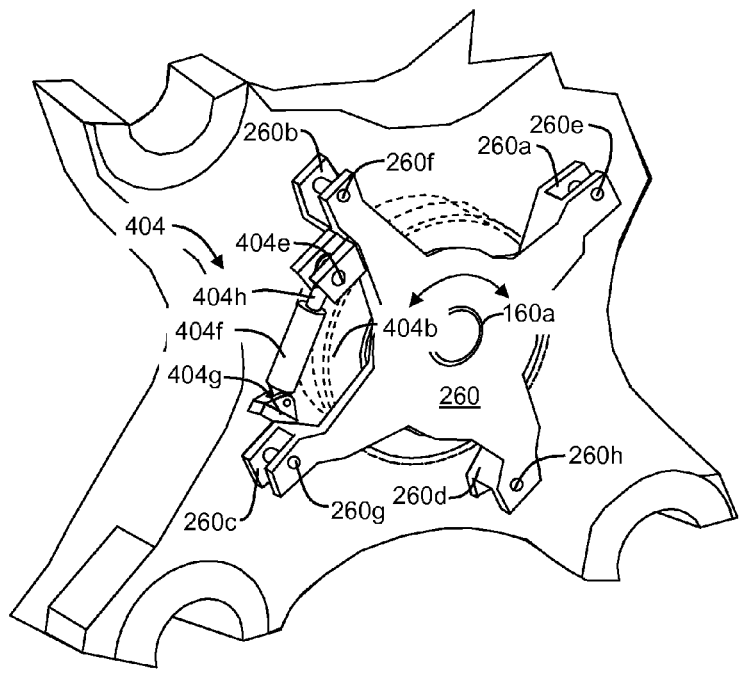

An alternative eccentric actuator is illustrated in FIG. 5d wherein a piston-cylinder actuator 404f is pivotably mounted to actuator housing 160 at mounting bracket 404g. A piston (not shown) of piston-cylinder actuator 404f is movable in translation and is connected to eccentric actuator push rod 404h. Eccentric actuator push rod 404h is connected to disk-like member rotor arm 260b by disk-like member arm connecting pin 404e. Eccentric actuator push rod 404h is free to pivot relative to disk-like member connecting pin 404e. By virtue of pivotable mounting of piston-cylinder actuator 404f to actuator housing 160 and pivotable connection of eccentric actuator push rod 404h to disk-like member arm 260b, piston-cylinder actuator 404f and push rod 404h are free to change direction relative to disk-like member arm 260b with rotation of disk-like member 260. Translation of eccentric actuator push rod 404h by piston cylinder actuator 404f effects rotation of disk-like member 260 relative to hub 160a through the predetermined angular range.

While the preferred embodiment of the strain rod locking mechanism comprises a disk-like member connected to all split locking nuts to effect simultaneous engagement and disengagement of the split locking nuts from the strain rods, other members, such as pivoting members, may be used in place of the disk-like member, so long as all split locking nuts are connected to such other members so that operation of such other members is effective to simultaneously move all nut halves of the split locking nuts. Further, while four types of actuators for the disk-like member of the preferred embodiment have been shown and described, substitution of alternative actuators may be made so long as such alternative actuators are effective to impart movement to the member(s) of the strain rod locking mechanism to which the nut halves are connected.

What is claimed is:

1. An apparatus for actuation of split locking nuts of a clamp unit of an injection molding machine, the clamp unit comprising: a fixed platen for supporting mold members; a movable platen assembly for supporting mating mold members; and a plurality of strain rods spanning from the fixed platen through the moveable platen assembly, the movable platen assembly comprising a mold supporting platen for supporting mating mold members, a clamp force actuator, and a plurality of split locking nuts each split locking nut comprising opposed movable nut halves for releaseably engaging the strain rods, the number of split locking nuts being no less than the number of strain rods, the apparatus comprising:
   a) a rotating member;
   b) a plurality of push rods; a first end of each push rod connected to the rotating member and a second end of each push rod connected to one movable nut half;
   c) the rotating member, opposed movable nut halves and push rods being arranged so that rotation of the rotating member through a predetermined angular range effects simultaneous longitudinal translation of the push rods and movement of all opposed moveable nut halves for each of engagement and disengagement of all split locking nuts with the strain rods; and,
   d) a split locking nut actuator for effecting rotation of the rotating member.

2. The apparatus according to claim 1 wherein the opposed movable nut halves of each split locking nut are mounted for pivoting movement and translation of the push rods is effective to pivot each movable nut half around its pivot axis.

3. The apparatus according to claim 2 wherein the pivot axes of opposed moveable nut halves are diametrically opposed relative to the associated strain rod.

4. The apparatus according to claim 2 wherein connections of the push rods to the rotating member and to the nut halves allows the push rods to pivot relative to the points of connection thereof.

5. The apparatus according to claim 4 wherein each push rod is connected to a nut half by a nut half connecting pin supported in a bore through a nut half so that alignment of the nut half connecting pin relative to the push rod is maintained under conditions of deflection that introduce misalignment between the pivot axis of the push rod connection and the centerline of the nut half bore.

6. The apparatus according to claim 5 wherein each nut half connecting pin is supported within the bore through the nut half by at least one elastomeric bushing, each elastomeric bushing having a rigid inner sleeve, a rigid outer sleeve and an elastomeric member therebetween, the elastomeric bushings being mounted with the nut half bore so that the rigid outer sleeve is immobilized within the nut half bore and the nut half connecting pin is received within the rigid inner sleeve so that misalignment between the centerline of the bore and the centerline of the nut half connecting pin result in elastic displacement of the rigid inner sleeve relative to the rigid outer sleeve.

7. The apparatus according to claim 1 wherein the split locking nut actuator comprises an eccentric actuator wherein a translating member is connected to the rotating member at a location along a radius from the center of rotation of the rotating member and displaced therefrom whereby translation of the translating member effects rotation of the rotating member within the predetermined angular range.

8. The apparatus according to claim 7 wherein the eccentric actuator comprises a rotating machine, a machine arm and a link, the machine arm being rotated by the rotating machine and the link being connected between the machine arm and rotating member at a location thereof along a radius from the rotating member center of rotation and displaced therefrom so that rotation of the rotating member effects translation of the link to impart rotation to the rotating member.

9. The apparatus according to claim 7 wherein the eccentric actuator comprises a piston and cylinder actuator and rotor push rod, the rotor push rod connected between the one of the piston and cylinder of the piston and cylinder actuator that is free to move in translation and to the rotating member at a location along a radius from the rotating member center of rotation and displaced therefrom so that translational movement of the rotor push rod imparts rotation to the rotating member.

10. The apparatus according to claim 1 wherein the split locking nut actuator comprises a rotating actuator having a rotor member and a stator member, the rotor and stator members being rotatable relative to one another, and a crank arm, the crank arm being eccentrically connected between the rotating member and the one of the rotor and stator free to rotate so that rotation of the rotatable member of the rotating actuator effects rotation of the rotating member through a predetermined angular range of rotation.

11. The apparatus according to claim 1 wherein the split locking nut actuator comprises a rack and pinion actuator comprising opposed toothed racks engaging a toothed pinion connected to the rotating member so that translation of the opposed toothed racks is converted to rotation of the rotating member, and translating actuators for bi-directional translation of each of the opposed toothed racks, translation of the opposed toothed racks being converted to rotation of the rotating member to effect rotation thereof through a predetermined angular range of rotation.

12. The apparatus according to claim 11 wherein each translating actuator comprises a piston and cylinder actuator operated by one of hydraulic and pneumatic pressure and a push rod, the push rod being connected between a toothed rack and the one of the piston and cylinder of the piston and cylinder actuator that is free to move.

13. The apparatus according to claim 1 wherein the split locking nut actuator comprises an electrically operated rotating machine comprising a rotor and stator rotatable relative to one another and the one of the rotor and stator that is free to rotate is connected to the rotating member so that controlled operation of the electrically operated motor is effective to rotate the rotating member through a predetermined angular range of rotation.

14. A method for operating a clamp unit of an injection molding machine, the clamp unit comprising: a fixed platen for supporting mold members; a movable platen assembly for supporting mating mold members; a plurality of strain rods spanning from the fixed platen through the moveable platen assembly, the movable platen assembly comprising a mold supporting platen for supporting mating mold members, a clamp force actuator, and a plurality of split locking nuts each split locking nut comprising opposed movable nut halves for releaseably engaging the strain rods, the number of split locking nuts being no less than the number of strain rods, the method comprising the steps of:
   a) simultaneously moving the movable nut halves to disengage the split locking nuts from the strain rods by a strain rod locking mechanism connected with all split locking nuts;

b) positioning the movable platen assembly so as to abut the mold members and mating mold members;

c) simultaneously moving the movable nut halves to engage the split locking nuts with the strain rods by a strain rod locking mechanism connected with all split locking nuts wherein:

(i) the split locking nut halves are pivotably supported by the movable platen assembly and are engaged with and disengaged from the strain rods by applying a force to each nut half at a point proximate the end of each nut half opposite the end at which the nut half pivot axis is located so as to pivot the nut half about the nut half pivot axis; and, (i)(ii) applying a force to each pivotable nut half comprises coupling rotation of a rotating member through a predetermined angular range to each pivotable nut half by a translating member; and d) operating the clamp force actuator to apply clamp force to the abutted mold assemblies sufficient for injection and curing of melt.

15. The method of claim 14 wherein rotation of the rotating member through a predetermined angular range is effected by coupling rotation of a rotating machine to the rotating member.

16. The method of claim 14 wherein rotation of the rotating member through a predetermined angular range is effected by an eccentric actuator.

17. The method of claim 14 wherein the step of coupling rotation of a rotating member to each nut half is effected by a push rod pivotably connected to the rotating member and pivotably connected to a nut half so that the direction of the push rod relative to the rotating member and relative to the nut half changes with rotation of the rotating member.

18. The method of claim 17 wherein the pivotable connection of each push rod to a nut half accommodates deflection of the nut half with the application of clamp force so that the push rod connection pivot axis at the nut half pivot can deviate from nominal alignment without inelastic deformation or damage to the pivotable connection.

* * * * *